United States Patent
Meier et al.

(10) Patent No.: US 11,462,000 B2
(45) Date of Patent: Oct. 4, 2022

(54) IMAGE-BASED DETECTION OF SURFACES THAT PROVIDE SPECULAR REFLECTIONS AND REFLECTION MODIFICATION

(71) Applicant: Apple Inc., Cupertino, CA (US)

(72) Inventors: Peter Meier, Tutzing Steinberg (DE); Daniel Kurz, Sunnyvale, CA (US); Brian Chris Clark, Palo Alto, CA (US); Mohamed Selim Ben Himane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/001,788

(22) Filed: Aug. 25, 2020

(65) Prior Publication Data
US 2021/0064910 A1   Mar. 4, 2021

Related U.S. Application Data

(60) Provisional application No. 63/035,160, filed on Jun. 5, 2020, provisional application No. 62/891,510, filed on Aug. 26, 2019.

(51) Int. Cl.
*G06V 10/60* (2022.01)
*G06T 7/73* (2017.01)
(Continued)

(52) U.S. Cl.
CPC .............. *G06V 10/60* (2022.01); *G06T 7/75* (2017.01); *G06V 10/145* (2022.01); *G06V 40/171* (2022.01)

(58) Field of Classification Search
CPC ............. G06K 9/4661; G06K 9/00281; G06K 9/2036; G06K 9/00664; G06T 7/75;
(Continued)

(56) References Cited

U.S. PATENT DOCUMENTS

2017/0098139 A1* 4/2017 Protter ................. G06T 7/0004
2017/0206691 A1* 7/2017 Harrises ............ G02B 27/0172
(Continued)

FOREIGN PATENT DOCUMENTS

KR   10-2016-0046471   4/2016
KR   10-2019-0039663   4/2019

OTHER PUBLICATIONS

Garcia-Garcia, A.; Orts-Escolano, S.; Oprea, S.O.; Villena-Martinez, V.; and Garcia-Rodriguez, J.; "A Review on Deep Learning Techniques Applied to Semantic Segmentation", arXiv: 1704.06857v1 [cs:CV] Apr. 22, 2017, pp. 1-23.
(Continued)

*Primary Examiner* — Edward F Urban
*Assistant Examiner* — Wassim Mahrouka
(74) *Attorney, Agent, or Firm* — Thompson Hine LLP

(57) ABSTRACT

Various implementations disclosed herein include devices, systems, and methods that detect surfaces and reflections in such surfaces. Some implementations involve providing a CGR environment that includes virtual content that replaces the appearance of a user or the user's device in a mirror or other surface providing a reflection. For example, a CGR environment may be modified to include a reflection of the user that does not include the device that the user is holding or wearing. In another example, the CGR environment is modified so that virtual content, such as a newer version of the electronic device or a virtual wand, replaces the electronic device in the reflection. In another example, the CGR environment is modified so that virtual content, such as a user avatar, replaces the user in the reflection.

20 Claims, 10 Drawing Sheets

(51) Int. Cl.
*G06V 10/145* (2022.01)
*G06V 40/16* (2022.01)

(58) Field of Classification Search
CPC ............. G06T 7/73; G06T 2207/20081; G06T 2207/10012; G06T 5/005; G06T 5/50; G06T 7/60; G06T 19/006; G06T 19/20; G06T 19/003; G06T 13/40; G06T 15/50; G06T 15/10; G06F 3/011; G06N 20/00; G06Q 50/10; G02B 27/017
See application file for complete search history.

(56) References Cited

U.S. PATENT DOCUMENTS

| | | | | |
|---|---|---|---|---|
| 2017/0285345 | A1* | 10/2017 | Ferens | G06F 1/163 |
| 2017/0316617 | A1* | 11/2017 | Jeong | G06Q 30/0643 |
| 2017/0337742 | A1* | 11/2017 | Powderly | G06K 19/06009 |
| 2018/0004478 | A1* | 1/2018 | Chen | G02B 27/017 |
| 2019/0122441 | A1* | 4/2019 | Agrawal | G06K 9/00671 |

OTHER PUBLICATIONS

Cleland, Kathy; "Image Avatars: Self-Other Encounters In A Mediated World", University of Technology, Sydney, 2008, pp. 1-154.

Owen, David; Ping-Lin, Chang; "Detecting Reflections by Combining Semantic and Instance Segmentation"; arXiv 1904.13273v1 [cs:CV] Apr. 30, 2019; pp. 1-12.

Latoschik, Marc Erich; Lugrin, Jean-Luc; Roth, Daniel; "FakeMi: A Fake Mirror System for Avatar Embodiment Studies"; Conference: Proceeding of the 22nd ACM Symposium on Virtual Reality Software and Technolgy (VRST); Nov. 2016, pp. 1-11.

"How Virtual Mirror Technology Will Change the Way You Shop"; http://www.quytech.com/blog/categor/augmented-reality/; Jul. 6, 2018, pp. 1-14.

Sherstyuk, Andrei; Gavrilova,Marina; "Virtual Roommates in Multiple Shared Spaces"; Avatar Reality, Inc. and University of Calgary; Mar. 2011, pp. 1-8.

Korean Intellectual Property Office, Notice of Preliminary Rejection (with English translation), Korean Patent Application No. 10-2020-0107783, 12 pages (dated Feb. 14, 2022).

* cited by examiner

IMAGE-BASED DETECTION OF SURFACES THAT PROVIDE SPECULAR REFLECTIONS AND REFLECTION MODIFICATION

CROSS-REFERENCE TO RELATED APPLICATIONS

This Application claims the benefit of U.S. Provisional Application Ser. No. 62/891,510 filed Aug. 26, 2019 and claims the benefit of U.S. Provisional Application Ser. No. 63/035,160 filed Jun. 5, 2020, which are both incorporated herein in its entirety.

TECHNICAL FIELD

The present disclosure generally relates to systems, methods, and devices that detect surfaces that provide specular reflections, modify reflections, or provide content that depicts such surfaces and reflections.

BACKGROUND

Existing techniques may not accurately detect and locate mirrors, reflective glass, liquids, and other surfaces that provide specular reflections in physical environments. Existing techniques may additionally not accurately depict such surfaces and reflections in providing content on electronic devices, including devices that are held, carried, or worn by users. For example, a mobile device held by a user may provide content based on images of the user's physical environment and the content may not adequately depict or otherwise utilize the mirrors and the reflections in those mirrors.

SUMMARY

Various implementations disclosed herein include devices, systems, and methods that detect mirrors, glass, liquids, and other surfaces and reflections in such surfaces. Some implementations involve detecting a reflection of a user or the user's device in a surface and providing virtual content that enhances or replaces the appearance of the reflection in content provided to the user. For example, a view of an environment may be modified to include a reflection of a user that does not include the electronic device that the user is holding or wearing. In another example, an environment may be modified so that virtual content, such as a newer version of the electronic device or a virtual light saber, replaces the electronic device in a reflection. In another example, the environment may be modified so that virtual content, such as an avatar, replaces the user in a reflection.

Some implementations involve a method performed by a processor executing instructions stored in a non-transitory computer-readable medium. Such a method may involve determining that a view of an environment includes a reflection of a user or an electronic device. Determining that the view includes a reflection may involve identifying that a viewpoint in a 3D model used to provide the view includes a surface that provides a specular reflection and determining an angle of the viewpoint relative to the surface. In some implementations, determining that the view includes the reflection involves identifying surfaces or materials in the physical environment, e.g., via a semantic analysis, and determining reflective properties of those surfaces or materials. In some implementations, determining that the view includes a reflection involves using computer vision to recognize a reflection of the device, the user, or another object, for example, by recognizing a mirror/reversed image of the device, user, or other object.

The method may further involve identifying replacement content to replace at least a portion of the reflection of the user or the electronic device. In some implementations, the replacement content includes portions of the user's body (e.g., a hand, an arm, etc.) or background content that will be visible when a handheld mobile device is erased, enhanced, or otherwise modified. In some implementations, the replacement content includes portions of the user's body (e.g., an arm, clothing, etc.) or background content that will be visible when a wrist-mounted device is erased, enhanced, or otherwise modified. In some implementations, the replacement content includes portions of the user's head (e.g., cheeks, eyes, eyebrows, hair, etc.) or background content that will be visible when a head-mounted device (HMD) is erased, enhanced, or otherwise modified.

In some implementations, the replacement content includes a different version of the same type of electronic device that will be displayed instead of the electronic device. Such replacement content may enable a user to visualize (e.g., virtually try on) newer versions of or alternatives to the electronic device currently being used. In some implementations, the replacement content includes an accessory (e.g., a protective case, band, etc.) that will be displayed with the electronic device or replacing an existing accessory of the electronic device.

In some implementations, the replacement content includes an avatar that will be displayed instead of the reflection of at least a portion of the user, e.g., replacing the user's head or entire body with the head or body of an avatar.

In some implementations, the replacement content includes a generated content around a portion of the electronic device or user that will be erased. For example, a portion of a user's clothing may be hidden by the device in the reflection. The replacement content may depict that content that would have otherwise been hidden had the reflection not been changed to erase or modify the device.

Replacement content may be generated or obtained using previously or concurrently obtained images of the physical environment, the user, or objects in the physical environment. For example, an image sensor may be configured (e.g., positioned in a downward-facing or body-facing orientation on a wearable device, etc.) to capture images of the user's body for use in generating replacement content. In another example, a dataset may be accessed to identify an avatar matching the user's characteristics and preferences for use in generating the replacement content. In another example, background content of other content used to replace previously hidden content may be generated via a shading technique, hole filling technique, content hallucination technique, ray-casting technique, and the like.

The method may further involve generating a modified view of the CGR environment based on the replacement content. For example, the electronic device may be erased by including replacement content of the corresponding portions of the user's body and or the physical environment that would otherwise be visible were the electronic device not in the view, e.g., invisible.

Some implementations disclosed herein locate mirrors, glass, liquids, and other surfaces that provide specular reflections based on images of a physical environment. In some implementations, a location of a surface depicted in a first image of a physical environment is determined. The location of the surface may be determined by detecting a specular reflection of a portion of an object (e.g., a user, device, or displayed content on a device) in the first image that matches (e.g., is the mirror image of) a portion of the object in a second image, e.g., from a body-facing/downward-facing camera or prior image of a user or object.

Some implementations involve a method performed by a processor executing instructions stored in a non-transitory computer-readable medium. Such a method may obtain a first image and a second image. The first image may be of a physical environment and include a specular reflection of a portion of an object. For example, the first image may be captured by a visible light/red-green-blue (RGB) image sensor and include a reflection of some or all of a person, the person's clothing, an electronic device, or any other object. The second image may include a direct view (e.g., not a reflection) of the portion of the same object. In some implementations, the second image is captured by a downward-facing or body-facing camera in the physical environment. In some implementations, the second image is captured at an earlier time and obtained from a dataset e.g., obtaining a user profile picture from a user profile. In some implementations, the first image and second image are portions of the same image. For example, a camera with or without a wide-angle lens may capture an image that includes both direct view of a portion of the user's face and a reflection of that portion of the user's face.

The method may include detecting a specular reflection in the first image based on matching the specular reflection of a portion of the object in the first image with the direct view of the portion of the object in the second image. As used herein, the phrase specular reflection refers to a reflection in which the angle of incidence (i.e., the angle between the incident ray and the normal) is approximately equal to the angle of reflection (i.e., the angle between the reflected ray and the normal) and the incident ray, the surface normal, and the reflected ray all lie on approximately the same plane. The matching may involve matching a shape, size, color, texture, or movement of the portion of the object. The matching may involve identifying a mirrored version of the object in which the left and right sides of the object are reversed.

The method may include determining a location of a surface in the physical environment based on the specular reflection. This may be based on the known or determined location or orientation of the device in the physical environment and the position or size of the specular reflection in the image. In some implementations, the pose (e.g. location and orientation) of the image capturing device in the physical environment is tracked based on the image data or motion sensor data, e.g., via a feature-matching-based localization technique, a simultaneous localization and mapping (SLAM) technique, etc. In some implementations, semantic labels (e.g., regarding object type, object materials, object characteristics, etc.) are additionally or alternatively used to determine the location of the surface.

In some implementations, a surface providing a specular reflection is located without generating a 3D model of the physical environment, e.g., using only a reflection identified in a 2D image or other sensor-based information about the physical environment. In some implementations, a pixel size of a user, device, or other object depicted in a reflection is measured based on the image data, compared with known dimensions of the user, device, or other object and the comparison used to determine a 3D location of the surface relative to the device's position in the physical environment. Objects depicted in images in such an image-based comparison may be semantically-labelled, identified, measured, or otherwise assessed using algorithmic or machine-learning-based models. In some implementations, addition sensor data, e.g., depth sensor data, is used to facilitate measurement, localization, identification, labelling, or other functions.

In some implementations, a location of a surface providing a specular reflection is determined based on a pose of an image capturing device at the time when an image is captured, the pixel position of a detected reflection of an object in the image, and the size of the detected reflection of the object in the image. In some implementations, the pixel position is used to determine the relative direction (e.g., vector direction from the camera location) in which the surface is located and the size is used to approximate the distance of the surface in that relative direction. The orientation of the surface may be determined to be orthogonal to the relative direction in which the surface is located. In some implementations, alternative or additional location techniques or sensor information, e.g., depth sensor data, may be used to determine the location of the surface.

In some implementations, a 3D model of the physical environment is generated, for example, based on the image data or motion sensor data. Objects in such a model may be semantically labelled, e.g., based on an automatic semantic labelling process using the image data. The pose (e.g., location and orientation) of the image capturing device may also be tracked relative to the 3D model. The content of images captured at various points in time of the physical environment may be correlated with objects in the 3D model. In some implementations, a surface is identified in a 3D model based on the image data. Some or all of such a surface may be further determined to be a specular based on detecting that the surface provides a specular reflection.

Some implementations use a device-specific identifier to determine a 3D location of a surface providing a specular reflection. Some implementations involve a method performed by a processor executing instructions stored in a non-transitory computer-readable medium. Such a method may produce an identifier via a light source at a device. The identifier may be a unique number or symbol specific to the device that is displayed on a display of the device. In another example, the identifier is a unique light pattern produced by a light at the device. The method obtains an image of a physical environment, for example, using visible light and/ or IR sensor. The method determines that the image includes a specular reflection of the device based on detecting content corresponding to the identifier in the image and determining that the identifier uniquely corresponds to the device. For example, this may involve determining that the identifier provides a number, symbol, or light pattern that corresponds to the device rather than any other device in the physical environment. The method determines a location of a surface in the physical environment that provided the specular reflection. The location is determined based on the specular reflection in the image. Determining the surface location may be based on the known/determined location and orientation of the device in the physical environment and the position or size of the specular reflection in the image.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
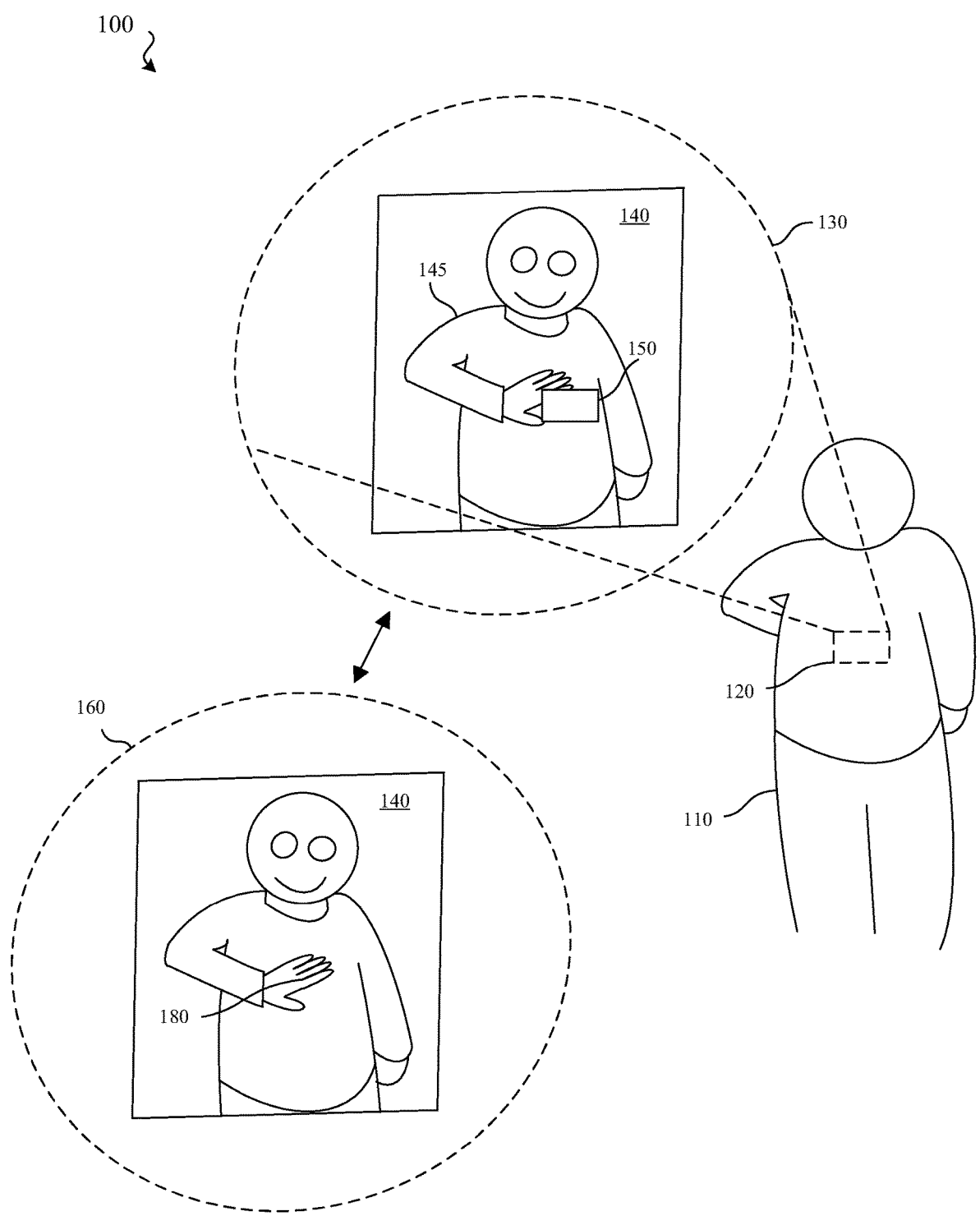
FIG. 1 illustrates a user viewing a computer-generated reality (CGR) environment that is modified based on an electronic device detecting a reflection in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example physical environment 100 is illustrated in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 100 includes a device 120 held by a user 110. The device 120 may include an integrated controller or may be in communication with a separate controller, one or both of which may be in the physical environment 100. A physical environment refers to a physical world that people can sense or interact with without aid of electronic systems. Physical environments, such as a physical park, include physical articles, such as physical trees, physical buildings, physical locations, and physical people (e.g., user 110). People can directly sense or interact with the physical environment 100, such as through sight, touch, hearing, taste, and smell.

In some implementations, the device 120 is configured to detect surfaces that provide specular reflections, detect reflections, or manage, coordinate, or present a computer-generated reality (CGR) environment to the user 110. In some implementations, a separate controller is configured to perform one or more of these functions. Such a controller (not shown) may be a computing device that is local or remote relative to the physical environment 100. In one example, a controller is a local server located within the physical environment 100. In another example, the controller is a remote server located outside of the physical environment 100 (e.g., a cloud server, central server, etc.). In some implementations, the controller is communicatively coupled with the device 120 via one or more wired or wireless communication channels (e.g., BLUETOOTH, IEEE 802.11x, IEEE 802.16x, IEEE 802.3x, etc.). In some implementations, the functionalities of a controller are provided by or combined with the device 120, for example, in the case of a mobile device that functions as a stand-alone unit.

According to some implementations, the device 120 presents a CGR environment to the user 110 while the user 110 is present within the physical environment 100. A CGR environment refers to a wholly or partially simulated environment that people sense or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a device turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense or interact with a CGR object using any one of their senses, including sight, sound, touch, taste, and smell. For example, a person may sense or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense or interact only with audio objects.

Examples of CGR include virtual reality and mixed reality. A virtual reality (VR) environment refers to a simulated environment that is designed to be based entirely on computer-generated sensory inputs for one or more senses.

A VR environment comprises virtual objects with which a person may sense or interact. For example, computer-generated imagery of trees, buildings, and avatars representing people are examples of virtual objects. A person may sense or interact with virtual objects in the VR environment through a simulation of the person's presence within the computer-generated environment, or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As shown in FIG. 1, in some implementations, a user 110 of a device 120 may use the device 120 to view a reflection from a surface 140 (e.g., a mirror or other surface having more than a threshold amount of specularity sufficient to provide an observable reflection) in a physical environment 100. Accordingly, should the device 120 directly pass the reflection through to the user 110, the reflection would include a reflected user 145 (e.g., a reflection of the user 110) and a reflected device 150 (e.g., a reflection of the device 120). However, as described in further detail, in some implementations the device 120 replaces the reflected device 150 with replacement content 180 (e.g., a depiction of the user's hand and shirt). For example, the device 120 may determine that a view of a CGR environment (e.g., view 130) includes a reflection of the user 110 or the device 120 (e.g., reflected device 150), identify replacement content 180, and modify the view of the CGR environment 130 using the replacement content 180 in place of some or all of the reflected user 145 or reflected device 150 (e.g., by graphically erasing, eliminating, or obfuscating portions of the reflected user 145 or reflected device 150), and e.g. by spatially aligning, photometrically adjusting, visually coherently rendering, superimposing, stenciling, feathering, or blending the replacement content to provide the user with a modified view 160.

In some implementations, a user 110 may expect to see his or her reflection without the electronic device 120 that the user is holding or wearing. Accordingly, it may be desirable for a CGR environment to provide a reflection that does not include a depiction of the electronic device. Thus, as illustrated in FIG. 1, a view 160 of the CGR environment may be provided with the reflection 150 of electronic device 120 erased.

Figure 2:
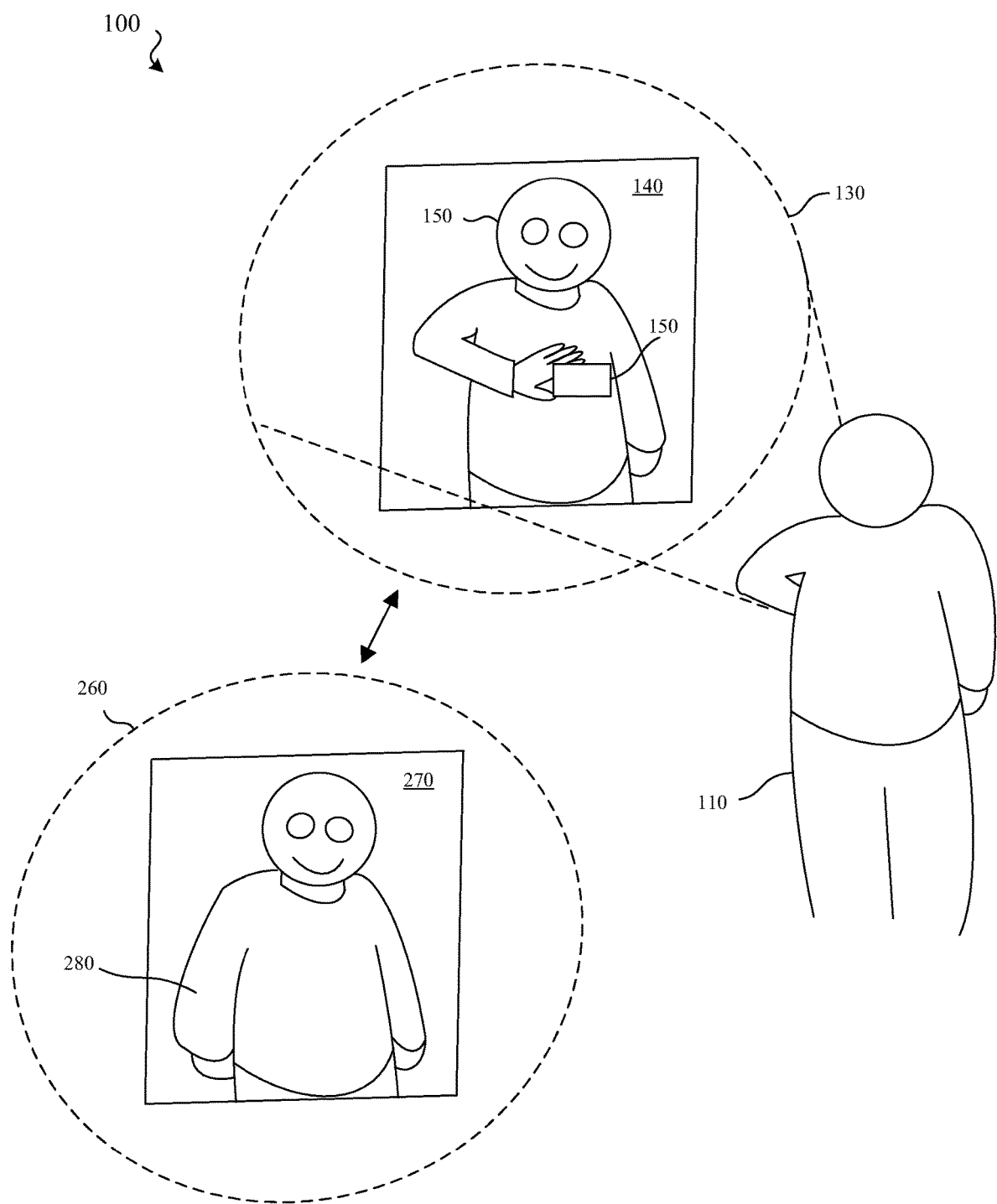
FIG. 2 illustrates an alternative modification of the CGR environment of FIG. 1 in accordance with some implementations.

FIG. 2 illustrates an alternative modification of the CGR environment of FIG. 1. As shown in FIG. 2, the device 120 replaces the reflected device 150 with replacement content 280 (e.g., a depiction of the user's arm, hand and shirt). For example, the device 120 may determine that a view of a CGR environment (e.g., view 130) includes a reflection of the user 110 or the device 120 (e.g., reflected device 150), identify replacement content 280, and modify the view of the CGR environment 130 using the replacement content 280 in place of the reflected device 150 (e.g., by graphically erasing, eliminating, or obfuscating portions of the reflected device 150 and the reflected user 145) to provide the user with a modified view 260. Thus, as illustrated in FIG. 2, a view 260 of the CGR environment may be provided with the reflection 150 of electronic device 120 erased and the user's arm extending downward rather than across his or her body.

Figure 3:
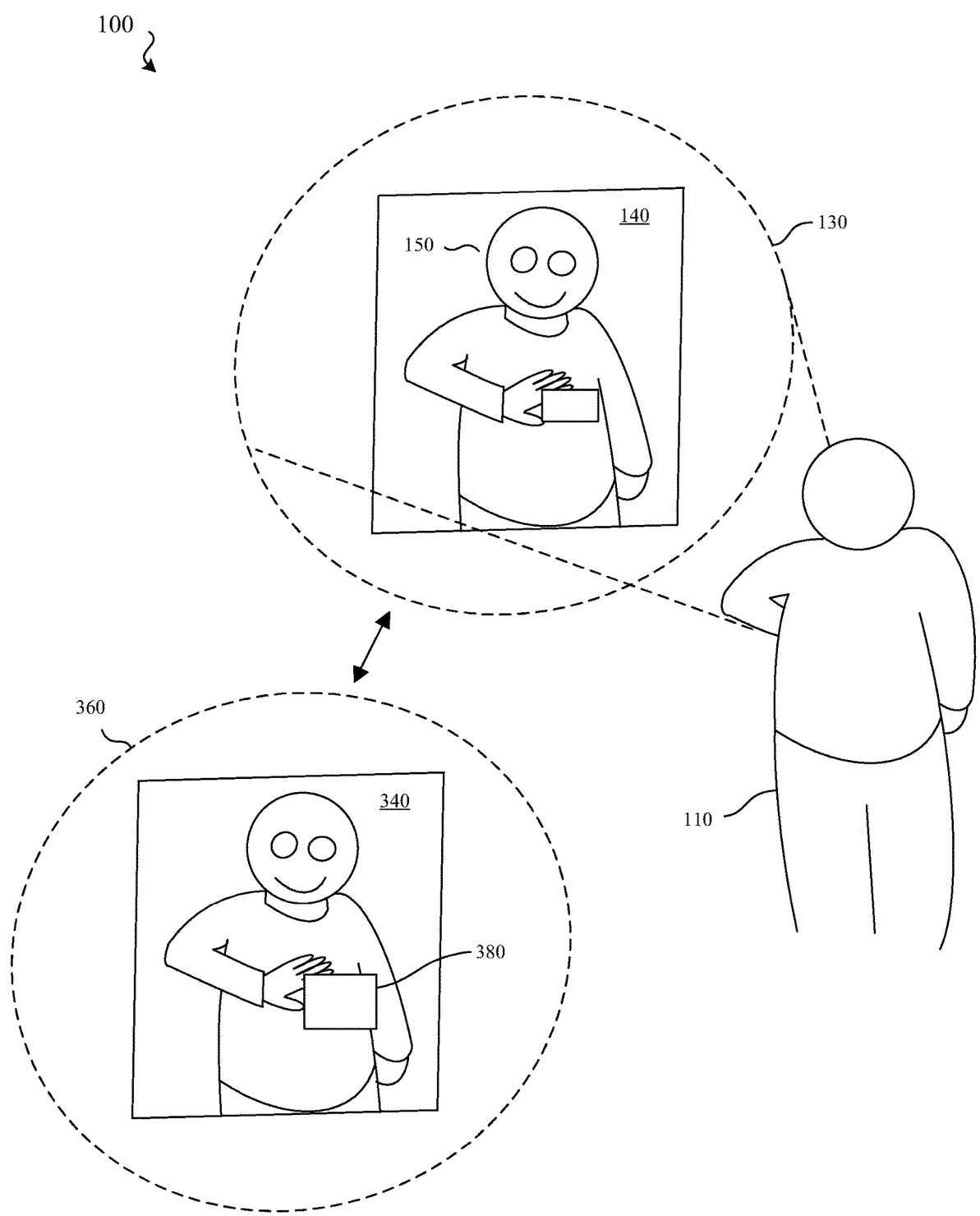
FIG. 3 illustrates an alternative modification of the CGR environment of FIG. 1 in accordance with some implementations.

FIG. 3 illustrates an alternative modification of the CGR environment of FIG. 1 in accordance with some implementations. As shown in FIG. 3, the device 120 replaces the reflected device 150 with replacement content 380 (e.g., a depiction of a different version of the same type of electronic device, such as, a newer version with a larger size than device 120). For example, the device 120 may determine that a view of a CGR environment (e.g., view 130) includes a reflection of the device 120 (e.g., reflected device 150), identify replacement content 380, and modify the view of the CGR environment 130 using the replacement content 380 in place of the reflected device 150 and surrounding areas to provide the user with a modified view 360. Thus, as illustrated in FIG. 3, a view 360 of the CGR environment may be provided with the reflection 150 of electronic device 120 replaced with a depiction of a larger electronic device of the same type.

Figure 4:
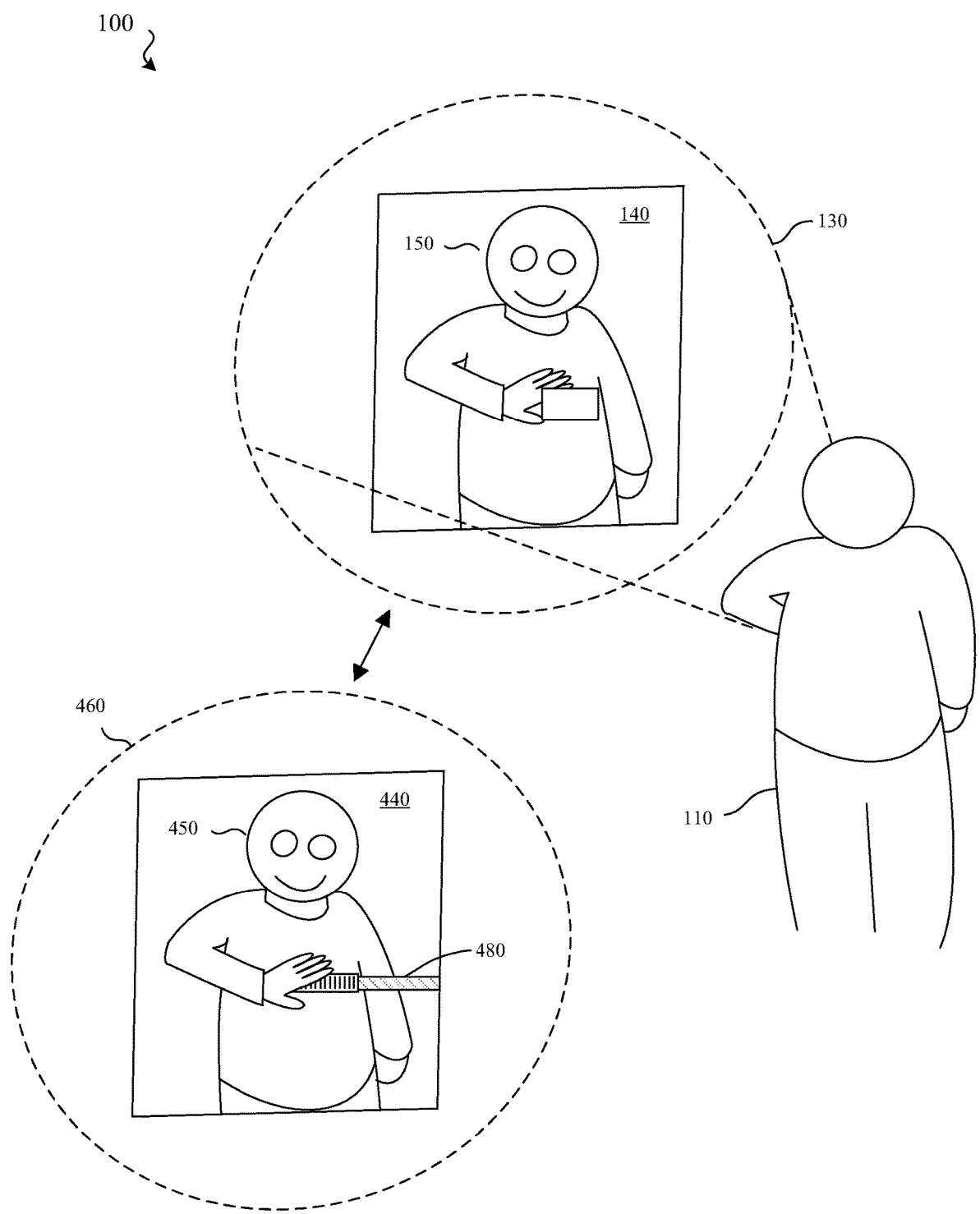
FIG. 4 illustrates an alternative modification of the CGR environment of FIG. 1 in accordance with some implementations.

FIG. 4 illustrates an alternative modification of the CGR environment of FIG. 1 in accordance with some implementations. As shown in FIG. 4, the device 120 replaces the reflected device 150 with replacement content 480 (e.g., a depiction of alternative content, such as, light saber). For example, the device 120 may determine that a view of a CGR environment (e.g., view 130) includes a reflection of the device 120 (e.g., reflected device 150), identify replacement content 480, and modify the view of the CGR environment 130 using the replacement content 480 in place of the reflected device 150 and surrounding areas to provide the user with a modified view 460. The alternative content may be identified based on various factors including, but not limited to, the context of the physical environment, user preferences, user input, correspondence to the device 120 (e.g., size, shape, etc.), and correspondence the part of the user's body contacting, holding, or wearing the device 120. As illustrated in FIG. 4, a view 460 of the CGR environment may be provided with the reflection 150 of electronic device 120 replaced with a depiction of a light saber being held by the user's hand that is holding the electronic device 120 in the physical environment.

Figure 5:
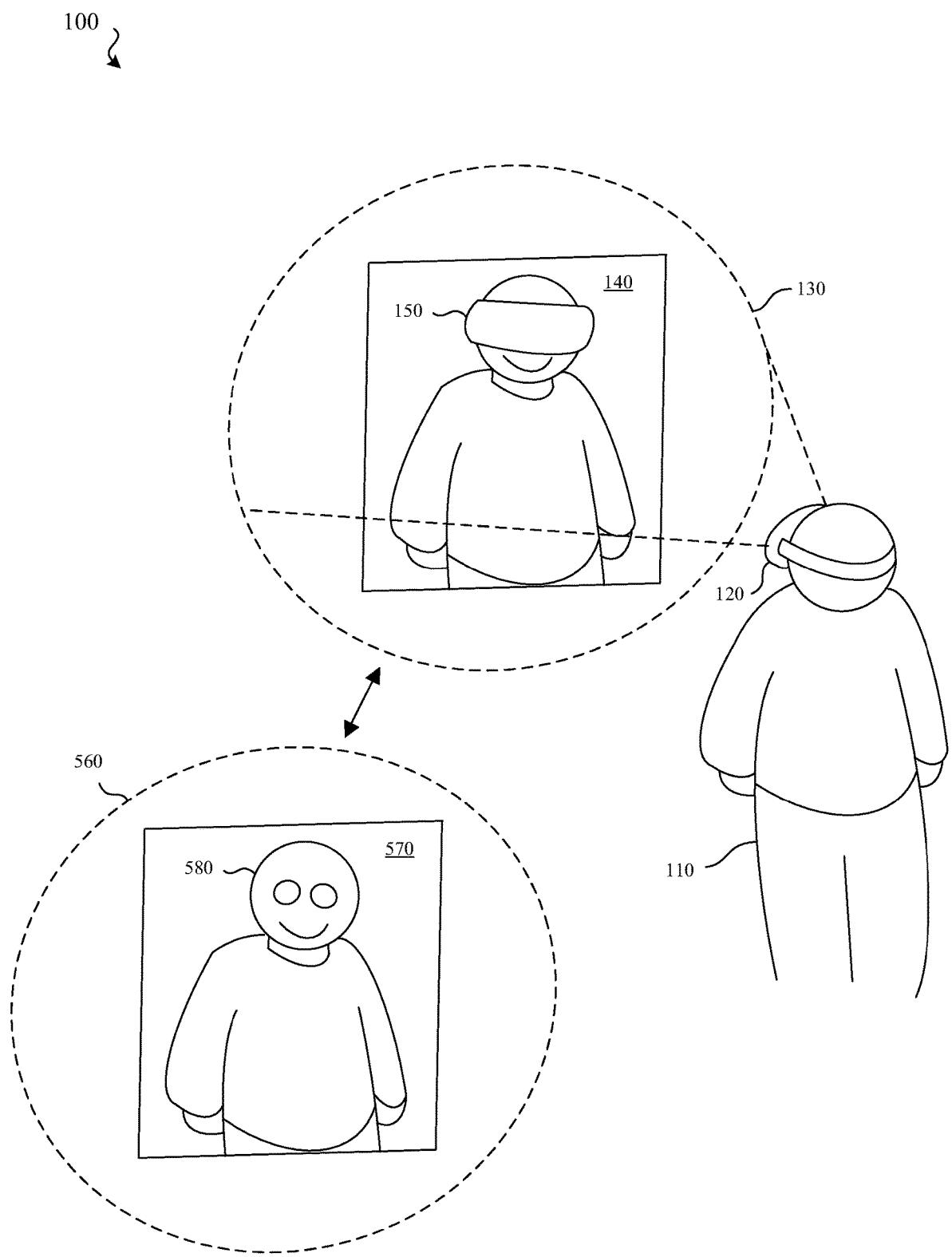
FIG. 5 illustrates a user viewing a computer-generated reality (CGR) environment that is modified based on an electronic device detecting a reflection in accordance with some implementations.

FIG. 5 illustrates a user viewing a computer-generated reality (CGR) environment that is modified based on an electronic device detecting a reflection in accordance with some implementations. As shown in FIG. 4, the device 120 is a head-mounted device (HMD) in this example. The device 120 replaces the reflected device 150 with replacement content 580 (e.g., a depiction of the user's cheeks, eyes, etc.). For example, the device 120 may determine that a view of a CGR environment (e.g., view 130) includes a reflection of the device 120 (e.g., reflected device 150), identify replacement content 580, and modify the view of the CGR environment 130 using the replacement content 580 in place of the reflected device 150 and surrounding areas to provide the user with a modified view 560. The replacement content may be obtained from one or more images of the user, e.g., concurrently captured via downward or body facing image sensors or from a stored user profile. As illustrated in FIG. 5, a view 560 of the CGR environment may be provided with the reflection 150 of electronic device 120 replaced with a depiction the user with the electronic device 120 erased.

Figure 6:
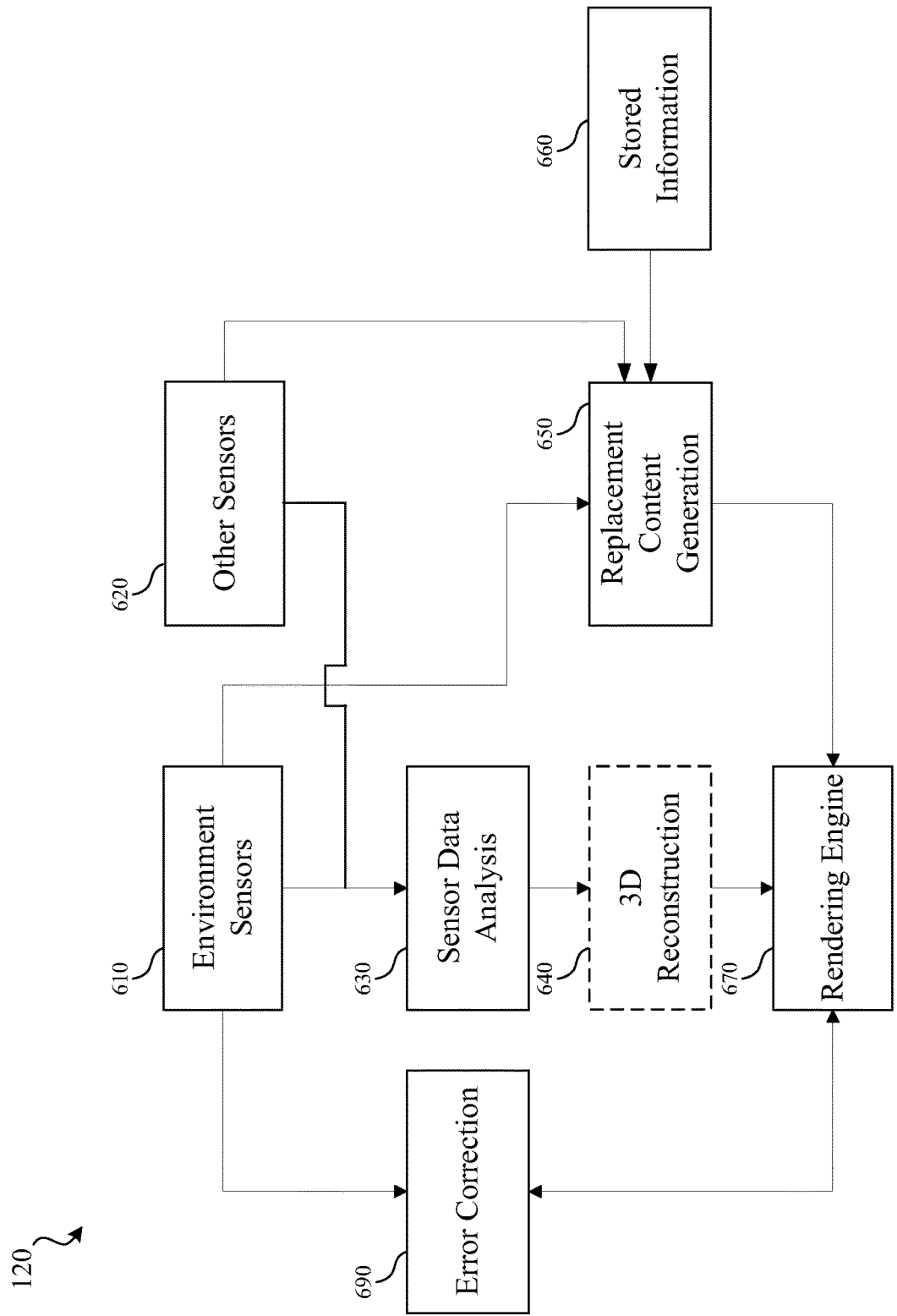
FIG. 6 is a block diagram illustrating a flowchart of a system that provides a CGR environment according to some implementations.

FIG. 6 illustrates a system flow of device 120 detecting surfaces providing specular reflections and providing a CGR environment. The device 120 uses one or more environment sensors 610 (e.g., one or more cameras) to capture, create, or provide a view 130 of a physical environment 100. For example, one or more outward facing cameras of a mobile device held by the user 110 or an HMD worn by the user 110 may capture one or more images of the physical environment 100. The same or additional cameras (e.g., other sensors 620) may capture other images and information in the physical environment. For example, environment sensors 610 may capture images or other information corresponding to the portion of the physical environment 100 viewable in a particular direction from the user's position in the physical environment 100 or otherwise partially or entirely surrounding the user in the physical environment 100. The other sensors 620, e.g., body-facing cameras, may simultaneously capture images or other information corresponding to portions of the user or the user's device. The one or more images from any of the sensors include any number of objects, including reflective surfaces such as mirrors, liquids, and glass.

In some implementations, the device 120 performs one or more sensor data analysis tasks (e.g., at block 630) using sensor data such as one or more captured images from the environment sensors 610 and the other sensors 620. For example, semantic segmentation may be used to associate each pixel of an image with a class label associated with a type of the object depicted by the pixel (e.g., person, table, chair, door, object, mirror, liquid, window, etc.) or a characteristic associated with the object depicted by the pixel (e.g., direct view, reflection, etc.) In some implementations, semantic segmentation or other sensor data analysis (block 630) may identify or distinguish image portions (e.g., pixels) that are part of a reflection of an object from image portions (e.g., pixels) that are part of a direct view of an object. The pixels associated with a reflection may have different color characteristics compared to pixels associated with direct views and such color characteristics may be identified, e.g., via algorithm or machine learning model, to classify pixels as corresponding to direct views or reflections.

In some implementations, a matching technique (e.g., algorithm, machine learning model, etc.) is configured to identify an object in an image (e.g., a pixel grouping) that is a reflection of another object in the same or another image (e.g., a pixel grouping) of the physical environment, user, or object. In some implementations, the matching technique accounts for left-right reversal that occurs in imaging in matching a reflection with an associated object. In some implementations, the matching technique accounts for differences in size that may occur as a result of objects and reflections corresponding to different distances from the one or more sensors, e.g., environment sensors 610 or other sensors 620. In some implementations, the matching technique accounts for color changes (e.g., diminished color intensity, fading, hue changes) that may occur in reflections. In some implementations, a machine learning model such as a neural network is trained to match a reflection with a corresponding direct view of an object using one or more input images. Such a machine learning model may be trained, for example, using ground truth training data that labels reflections (e.g., image portions or pixels) that correspond to direct views of objects in one or more training images (e.g., image portions or pixels).

In some implementations, the sensor data analysis (block 630) identifies pixels associated with surfaces themselves, e.g., pixels that depict that actual surface of a glass window or mirror. For example, an image-based analysis, e.g. computer vision using algorithms or machine learning, may be used to identify a mirror, window surface, or fluid surface.

In some implementation the sensor data analysis (block 630), e.g. computer vision algorithms or machine learning model, may be used to measure the amount of specular reflectivity, opacity, translucency, transparency, de-fraction, or refraction of a surface. For example, machine learning may be used to measure the specular reflectivity associated with a surface of an object depicted by one or more pixels, for example, providing a value representing specular reflectivity of an object on a numerical scale.

In some implementations, the device 120 performs an optional 3D model (block 640). For example, the device 120 may generate a 3D model of the physical environment 100. In some implementations, the 3D model may be generated from multiple images/recordings, where the multiple captured images/recordings are combined to form a captured portion of the physical environment 100 (e.g., based on view 130) or multiple captured portions of the physical environment 100 are combined to generate the 3D model. In some implementations, reference computer-aided drawing ("CAD") models may be used to represent objects in the 3D model, including the object or the replacement content.

The 3D model may be mapped onto any appropriate canonical coordinate system, e.g., plane coordinates, word coordinates, geometry coordinates, etc. For example, a 360-degree (spherical) image around a point of projection may be used as an environment map (or environment reflection map) in standard computer graphics renderers. Moreover, the environment map may be represented in any number of interchangeable formats, e.g., spherical representation (equirectangular projection) or cubemap representation. The choice of format may be based on the requirements of a particular implementation or rendering engine.

Moreover, in some implementations, semantic segmentation or other sensor data analysis 630 may be performed simultaneously with, in communication with, or based on the 3D model 640. For example, the 3D model may be performed based on the identification of objects by the semantic segmentation or the semantic segmentation may be performed based on the 3D model.

Figure 7:
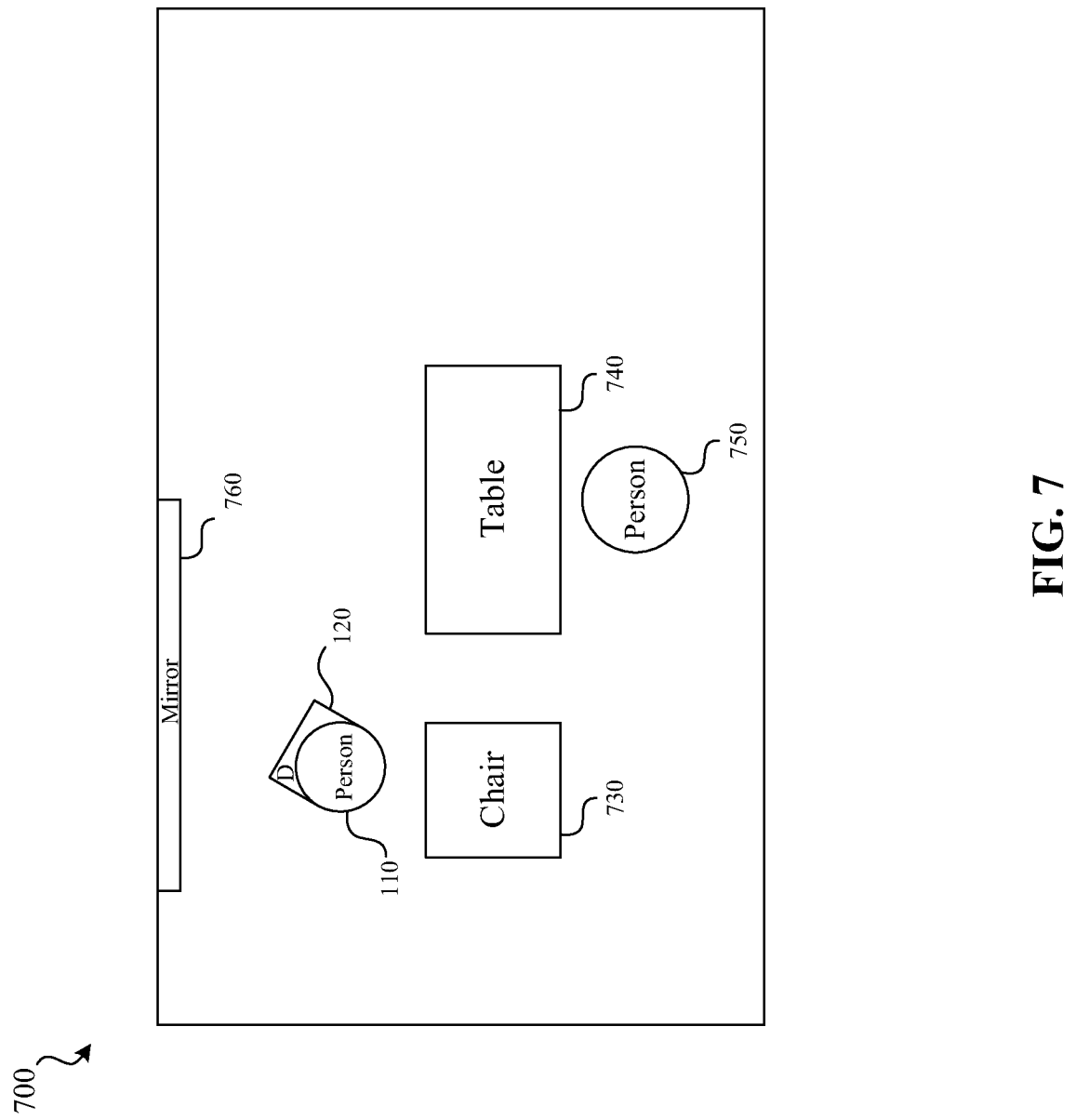
FIG. 7 illustrates an overhead view of items included in a three-dimensional (3D) semantic model in accordance with some implementations.

Accordingly, a 3D model may include semantic identifications. FIG. 7 depicts an overhead (2D) view 700 of a 3D model of a physical environment. In this example, the semantical labels correspond to object type classifications, for example, generated by a semantic segmentation machine learning model. In the example, the user 110 has been labeled "Person," the device 120 has been labelled "D" (abbreviation for "Device"), the object 730 has been labelled "Chair," the object 740 has been labelled "Table," the object 750 has been labelled "Person," and the object 760 has been labelled a "Mirror."

Returning to FIG. 6, in some implementations, the device 120 generates replacement content (block 650) associated with a reflection. The replacement content that is generated may be 3D content to be added to or replace 3D content of the 3D model 640. A modified view may then be provided by generating a 2D view of modified 3D model from an appropriate viewpoint.

In other implementations, the replacement content is 2D content to be added to or replace 2D content of a view of a physical environment. For example, a 2D view of a 3D model may be generated and then modified to replace select portions/pixels of the 3D view.

In other implementations, no 3D model need be generated or used. Instead, one or more images of the physical environment may be captured and then modified with the replacement content.

In some implementations, the replacement content will replace a portion of a reflection corresponding to a portion of a user or user device, for example, as depicted in FIGS. 1-5. Replacement content may include generated background content in order to enhance the realism of the replacement content. In some implementations, in order to accurately depict the reflection of the user 110 (e.g., minus the device 120), the device 120 identifies whether the replacement content adequately matches or corresponds to adjacent texture in the captured image data. In implementations, the device 120 determines whether a corresponding texture for all of the pixels of the 3D model is known and, if there are pixels with no texture, the missing texture may be synthesized. In an implementation, such identification may be made based on the texture of the replacement content in comparison to the immediately surrounding texture, e.g., whether the replacement content is terminated by the surrounding environment. In some implementations, an environment map may be used to represent the different textures (e.g., colors, patterns, etc.) and the completion of the environment map to provide replacement content may include synthesizing a corresponding texture in the replacement content for any pixels with no texture by extending the existing texture or employing synthesis algorithms, e.g., machine learning based algorithms.

In some implementations, the replacement content includes user depictions generated based on images of the user or one or more identified avatars. In some implementations, the other sensors 220 (e.g., inward-facing or body-facing cameras) may collect information about the user 110 (e.g., the user's expressions, eye movement, etc.). In some implementations, the replacement content source information is stored (e.g., stored information 660) and used in generating replacement content, including an altered or modified reflection of the user 110 or device 120). In some implementations, the information collected by the environment sensors 610 or other sensors 620 may be used to match a size or shape of an avatar to the user 110.

In some implementations, the other sensors 620 include one or more eyebrow sensors that track expressions of the user's eyebrows/forehead. In some implementations, the other sensors 620 include one or more lower jaw tracking sensors that track expressions of the user's mouth/jaw. For example, expressions of the brow, mouth, jaw, and eyes captured by sensors may be used to simulate expressions on an avatar of the user 110 (e.g., a reflection of the user), or to selectively render and composite content for viewing by the user based at least in part on the user's reactions.

In some implementations, the device 120 stores information in stored information 660. For example, in order to create an avatar, shape prediction methods may be used to localize certain facial structures of the user 110 (e.g., the features that are more important to describing the face of the user 110). Moreover, the stored information 660 may include modeling the shapes, size, relative distance, and depth of different elements of the user 110 in a stored mask. In some implementations, the stored mask may be applied to an avatar to customize the avatar's appearance in order to mimic the user's appearance.

In some implementations, the rendering engine 670 presents content to the user. The content may be a modified view of a CGR environment. In some implementations, the rendering engine 670 combines the sensor data analysis 630, 3D model 640, and replacement content generation 650 to present a CGR environment to the user 110. In some implementations, the appearance of the surface 140 (e.g., a mirror), a reflection of the user 110, or a reflection of the physical device (reflected device 150) may be dependent upon the distance, relative position, or orientation of the environment sensors 210 to the surface 140, the amount/intensity of light captured by the environment sensors 210, or the presence or absence of particular light sources. For example, the rendering engine 670 may identify different reflective characteristics for the replacement content by identifying a geometry of the reflective surface or the reflection. Furthermore, in some implementations, the rendering engine 670 may identify differing characteristics based on the position of the user or the user's device.

In implementations, the replacement content (e.g., a reflection where a device held by a user is erased or modified or an HMD worn by a user is erased or modified) may be calculated by selecting a 3D point, e.g., a center of projection, where the reflection of the environment is accurately depicted in relation to the position of the object. For example, if the object is a mirror, the selected center of projection may be the center of the mirror. In some implementations, an environment map, e.g., a cube map or a sphere map, may be generated, based on the 3D model, around the center of projection using a rendering engine to represent the textures of the 3D model. The rendering of the replacement content may be dependent on the environment map, the locations or orientations of the device, the surfaces, the users, and other objects.

Furthermore, the replacement content (e.g., synthesized reflection of the user 110 minus the device 120) may be dependent on the reflectivity, roughness, or transparency of the surface 140.

The reflectivity of a specular reflective surface may be used to determine characteristics of the replacement content. The reflectivity may be automatically determined based on the type of object or its characteristics, e.g., the material composition or properties of the object. For example, a reflective surface made of a material having high specular reflectivity may require highly-defined replacement content, while in another example, a reflective surface with relatively less specular reflectivity, or with a rougher surface, may only require minimal definition and detail of the replacement content. For example, reflections generated for glass windows and water may be generated with reduced color intensity or may be based upon (e.g., combined with) content seen through the glass or water.

In some implementations, a transition between the captured portion of the physical environment and replacement content may be blended to avoid a harsh or unrealistic transition between the texture of the captured portion of the physical environment and replacement content. For example, the borders of the captured portion of the physical environment or the replacement content may be blended with the surrounding environment. Moreover, the device 120 may reiteratively perform error correction (block 690) by comparing the rendered content to the captured environment to ensure accuracy.

Figure 8:
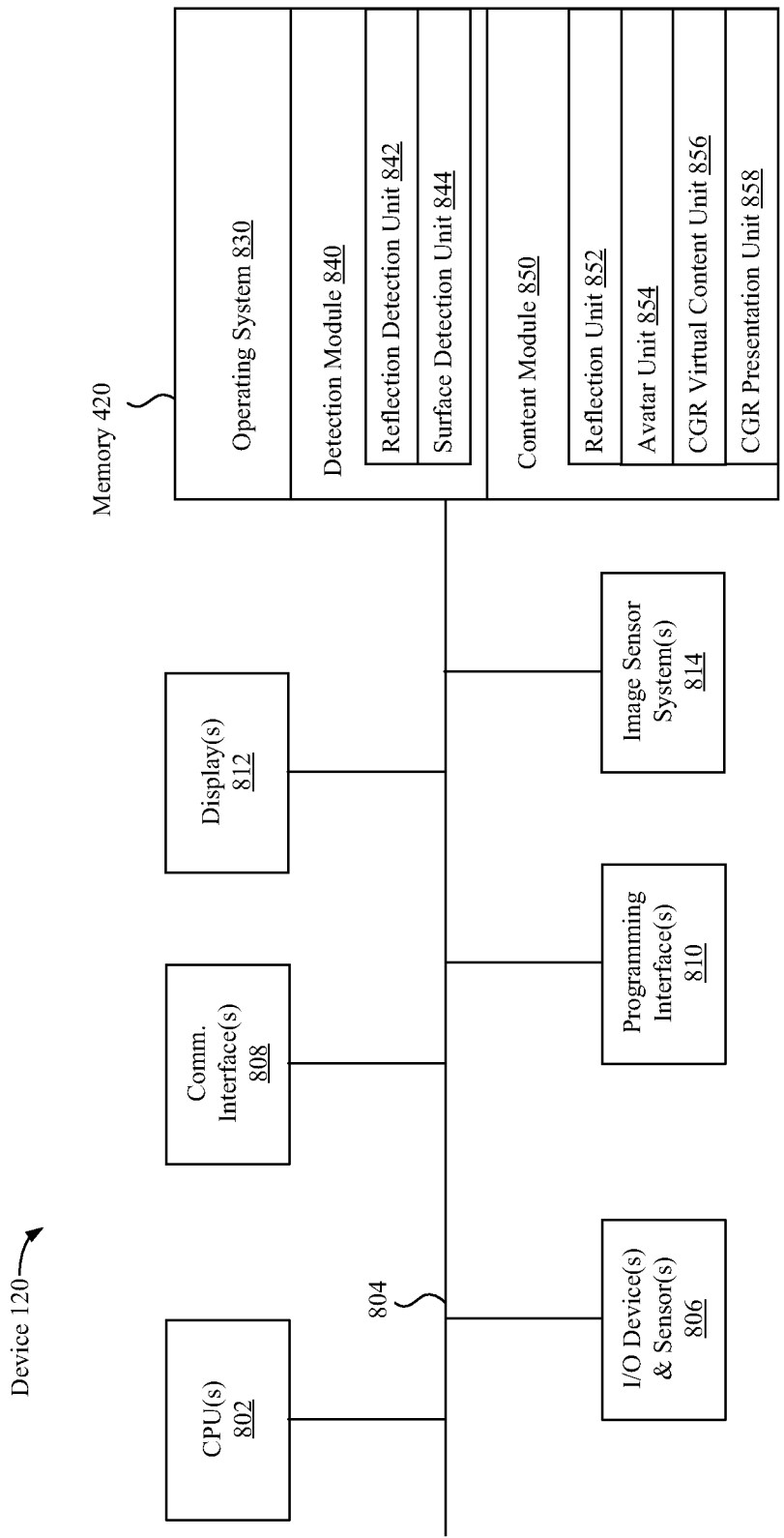
FIG. 8 is a block diagram of an example device in accordance with some implementations.

FIG. 8 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 810, one or more displays 812, one or more interior or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present a CGR environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 812 correspond to diffractive, reflective, polarized, holographic, etc. waveguide displays. For example, the device 120 includes a single display. In another example, the device 120 includes a display for each eye of the user.

The memory 820 includes high-speed random-access memory, such as DRAM, CGRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830, a detection module 840, and a content module 850.

The operating system 830 includes procedures for handling various basic system services and for performing hardware dependent tasks.

In some implementations, the detection module 840 includes a reflection detection unit 842 and a surface detection unit 844. In some implementations, the reflection detection unit 842 is configured to detect a reflection, for example, using one or more images of a physical environment or a 3D model of the physical environment. The reflection detection unit 842 may include detecting a specular reflection in a first image based on matching the specular reflection of a portion of the object in the first image with a direct view of the portion of the object in a second image. This may involve identifying a mirrored version of the object in which the left and right sides of the object are reversed. The matching may involve matching a shape, size, color, texture, or movement of the portion of the object.

In some implementations, the surface detection unit 844 is configured to detect a surface providing a reflection in the physical environment. The surface detection unit 844 may determine a location of a surface in the physical environment based on one or more specular reflections identified by reflection detection unit 842. This may be based on the known or determined location or orientation of a device in the physical environment and the position or size of a specular reflection in an image captured by the device. In some implementations, the pose (e.g. location and orientation) of the image capturing device in the physical environment is tracked based on the image data or motion sensor data, e.g., via a feature-matching-based localization technique, a simultaneous localization and mapping (SLAM) technique, etc. In some implementations, a 3D model of the physical environment is generated, for example, based on the image data or motion sensor data. Objects in such a model may be semantically labelled, e.g., based on an automatic semantic labelling process using the image data. The pose (e.g., location and orientation) of the image capturing device may also be tracked relative to the 3D model. The content of images captured at various points in time of the physical environment may be correlated with objects in the 3D model. In some implementations, a surface is identified in a 3D model based on the image data. Some or all of such a surface may be further determined to be specular based on detecting that the surface provides a specular reflection.

In some implementations, a location of a surface is determined based on a pose of an image capturing device at the time when an image is captured, the pixel position of a detected reflection of an object in the image, and the size of the detected reflection of the object in the image. In some implementations, the pixel position is used to determine the relative direction in which the surface is located and the size is used to approximate the distance of the surface in that relative direction. The orientation of the surface may be determined to be orthogonal to the relative direction in which the specular reflection is located. In some implementations, alternative or additional location techniques or sensor information, e.g., depth sensor data, may be used to determine the location of the surface.

In some implementations, the content module 850 is configured to create, edit, present, or experience CGR environments. In some implementations, the content module 850 includes a reflection unit 852, an avatar unit 854, a CGR virtual content unit 856, and a CGR presentation unit 858.

In some implementations, the reflection unit 852 is configured to identify a reflection from an object. For example, the reflection unit 852 may identify a reflection of user holding a mobile device or wearing an HMD. In some implementations, the reflection unit may use semantic segmentation or 3D model to identify the reflection or the reflective surface. In some implementations, one or more functions of reflection detection unit 842 and reflection unit 852 are combined into a single unit.

In some implementations, the avatar unit 854 is configured to generate an avatar or associate an avatar with a user (e.g., a person, device, account, etc.). For example, the avatar unit 854 may be configured to collect or store information regarding a user's facial features to form a mask used to mimic a user's appearance. In some implementations, the avatar unit 854 tracks facial features or characteristics (e.g., eyes, mouth, eyebrows, etc.) of a user in order to match features of the avatar to the features of the user.

In some implementations, the CGR virtual content unit 856 is configured to determine virtual content used to replace a reflection of the user, a reflection of the device, or a reflection of the user holding or wearing a device. For example, the CGR virtual content unit may generate the replacement reflection based on the angle or viewpoint of the device with respect to the object.

In some implementations, the CGR presentation unit 858 is configured to present virtual content (e.g., replacement or updated reflection of the user or device) that will be used as part of CGR environments for one or more users. For example, the user may view and otherwise experience a CGR-based user interface that allows the user to select, place, move, and otherwise experience and interact with a CGR environment, for example, via hand gestures, voice commands, input device inputs, etc.

Although these modules and units (e.g., modules 840, 850 and units 842, 844, 852, 854, 856, 858) are shown as residing on a single device (e.g., the device 120), it should be understood that in other implementations, any combination of these modules and units may be located in separate computing devices.

Moreover, FIG. 8 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 9:
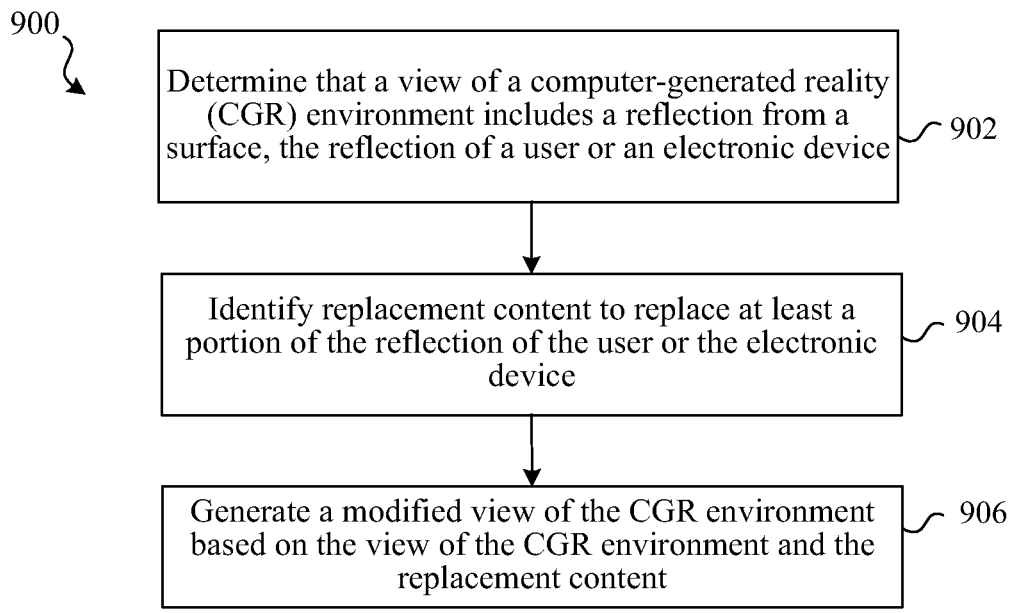
FIG. 9 is a flowchart illustrating an exemplary method of providing a view of a CGR environment according to some implementations.

FIG. 9 is a flowchart illustrating an exemplary method 900 of providing a view of a CGR environment. The method 900 may be performed by a device such as device 120. The method 900 may be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 902, the method 900 determines that a view of a CGR environment includes a reflection from a surface, the reflection of a user or an electronic device. In one example, the view includes a reflective surface (such as a mirror) and the view further includes a reflection of a user holding a device (such as a mobile phone) or wearing a device (such as an HMD). Determining that the view includes a reflection may involve identifying that a viewpoint in a 3D model used to provide the view includes a surface and determining an angle of the viewpoint relative to the surface. In some implementations, determining that the view includes the reflection involves identifying objects or materials in the physical environment, e.g., via a semantic analysis, and determining reflective properties of those objects or materials. In some implementations, determining that the view includes a reflection involves using computer vision to recognize the device, the user, or another object, for example, by recognizing a mirror/reversed image of the device, user, or other object.

At block 904, the method 900 identifies replacement content to replace at least a portion of the reflection of the user or the electronic device. In some implementations, the replacement content includes portions of the user's body (e.g., a hand, an arm, etc.) or background content that will be visible when a hand-held device is erased, enhanced, or otherwise modified. In some implementations, the replacement content includes portions of the user's body (e.g., an arm, clothing, etc.) or background content that will be visible when a wrist-mounted device is erased, enhanced, or otherwise modified. In some implementations, the replacement content includes portions of the user's body (e.g., cheeks, eyes, eyebrows, hair, etc.) or background content that will be visible when a head mounted device (HMD) is erased, enhanced, or otherwise modified. In some implementations, the replacement content includes a different version of the same type of electronic device that will be displayed instead of the electronic device. Such replacement content may enable a user to visualize (e.g., virtually try on) newer versions of or alternatives to the electronic device currently being used. In some implementations, the replacement content includes an accessory (e.g., a protective case, band, etc.) that will be displayed with the electronic device or replacing an existing accessory of the electronic device. In some implementations, the replacement content includes an avatar that will be displayed instead of the reflection of at least a portion of the user, e.g., replacing the user's head or entire body with the head or body of an avatar. In some implementations, the replacement content includes a background area around a portion of the electronic device or user that will be erased.

Replacement content may be generated or obtained using previously or concurrently obtained images of the physical environment, the user, or objects in the physical environment. For example, an image sensor may be configured (e.g., positioned in a downward-facing or body-facing orientation on a wearable device, etc.) to capture images of the user's body for use in generating replacement content. In another example, a dataset may be accessed to identify an avatar matching the user's characteristics and preferences for use in generating the replacement content. In another example, background content may be generated via a shading technique, hole filling technique, content hallucination technique, ray-casting technique, and the like.

At block 906, the method 900 generates a modified view of a CGR environment based on the view of the CGR environment and the identified replacement content. The modified view may include a modified reflection of a user without a device or of the user with a modified device. For example, the electronic device may be erased by including replacement content of the corresponding portions of the user's body and or the physical environment that would otherwise be visible were the electronic device not in the view, e.g., invisible. The replacement content that is generated may be 3D content to be added to or replace 3D content of the 3D model 640. A modified view may then be generated by generating a 2D view of modified 3D model from an appropriate viewpoint. In other implementations, the replacement content is 2D content to be added to or replace 2D content of a view of a physical environment. For example, a 2D view of a 3D model may be generated and then modified to replace select portions/pixels of the 3D view. In other implementations, no 3D model need be generated or used. Instead, one or more images of the physical environment may be captured and then modified with the replacement content to provide a CGR environment.

Figure 10:
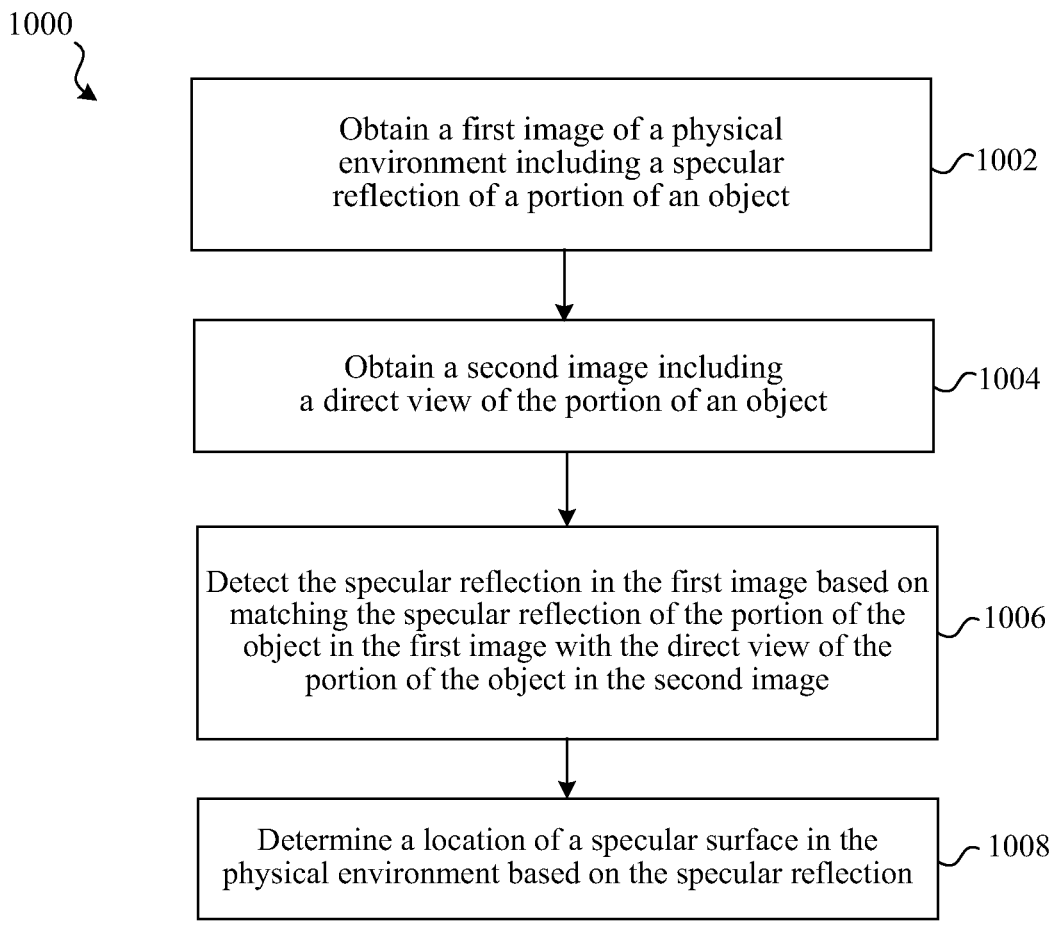
FIG. 10 is a flowchart illustrating an exemplary method of detecting a surface providing a specular reflection according to some implementations.

FIG. 10 is a flowchart illustrating an exemplary method 1000 of detecting a surface providing a specular reflection. The method 1000 may be performed by a device such as device 120. The method 1000 may be performed at a mobile device, HMD, desktop, laptop, server device, or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1002, the method 1000 obtains a first image of a physical environment including a specular reflection of a portion of an object. For example, the first image may be captured by a visible light/red-green-blue (RGB) image sensor and include a reflection of some or all of a person, the person's clothing, an electronic device, or any other object.

At block 1004, the method 1000 obtains a second image including a direct view (e.g., not a reflection) of the portion of the same object. In some implementations, the second image is captured by a downward-facing or body-facing camera in the physical environment. In some implementations, the second image is captured at an earlier time and obtained from a dataset e.g., obtaining a user profile picture from a user profile. In some implementations, the first image and second image are portions of the same image. For example, a camera with or without a wide-angle lens may capture an image that includes both direct view of a portion of the user's face and a reflection of that portion of the user's face.

At block 1006, the method 1000 detects a specular reflection in the first image based on matching the specular reflection of a portion of the object in the first image with the direct view of the portion of the object in the second image. The matching may involve matching a shape, size, color, texture, or movement of the portion of the object. The matching may involve identifying a mirrored version of the object in which the left and right sides of the object are reversed.

At block 1008, the method 1000 may determine a location of a surface in the physical environment based on the specular reflection. This may be based on the known or determined location or orientation of the device in the physical environment and the position or size of the specular reflection in the image. In some implementations, the pose (e.g. location and orientation) of the image capturing device in the physical environment is tracked based on the image data or motion sensor data, e.g., via a feature-matching-based localization technique, a simultaneous localization and mapping (SLAM) technique, etc. In some implementations, semantic labels (e.g., regarding object type, object materials, object characteristics, etc.) are additionally or alternatively used to determine the location of the surface.

In some implementations, a surface providing a specular reflection is located without generating a 3D model of the physical environment, e.g., using only a reflection identified in a 2D image or information about the physical environment. In some implementations, a pixel size of a user, device, or other object depicted in a reflection is measured based on the image data, compared with known dimensions of the user, device, or other object and the comparison used to determine a 3D location of the surface relative to the device's position in the physical environment, e.g. by also considering the camera's intrinsic parameters, such as focal length. Objects depicted in images in such an image-based comparison may be semantically-labelled, identified, measured, or otherwise assessed using algorithmic or machine-learning-based models. In some implementations, addition sensor data, e.g., depth sensor data, is used to facilitate measurement, localization, identification, labelling, or other functions.

In some implementations, a location of a surface is determined based on a pose of an image capturing device at the time when an image is captured, the pixel position of a detected reflection of an object in the image, and the size of the detected reflection of the object in the image. In some implementations, the pixel position is used to determine the relative direction in which the surface is located and the size is used to approximate the distance of the surface in that relative direction. The orientation of the surface may be determined to be orthogonal to the relative direction in which the specular reflection is located. In some implementations, alternative or additional location techniques or sensor information, e.g., depth sensor data, may be used to determine the location of the surface.

In some implementations, a 3D model of the physical environment is generated, for example, based on the image data, depth data, or motion sensor data and used to detect the specular reflection or determine the location of the surface. Objects in such a model may be semantically labelled, e.g., based on an automatic semantic labelling process using the image data. The pose (e.g., location and orientation) of the image capturing device may also be tracked relative to the 3D model. The content of images captured at various points in time of the physical environment may be correlated with objects in the 3D model. In some implementations, a surface is identified in a 3D model based on the image data. Some or all of such a surface may be further determined to be specular based on detecting that the surface provides a specular reflection.

Figure 11:
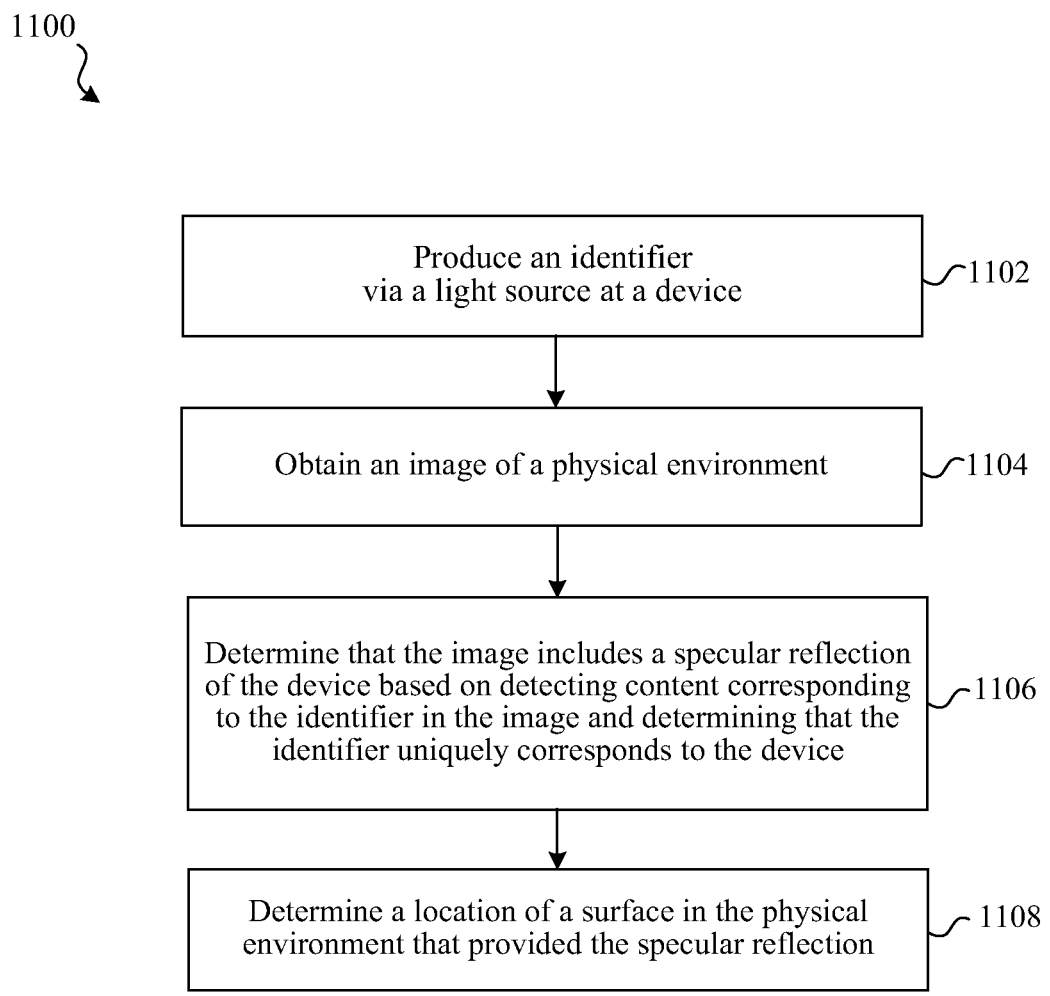
FIG. 11 is a flowchart illustrating an exemplary method of detecting a surface providing a specular reflection according to some implementations.

FIG. 11 is a flowchart illustrating an exemplary method 1100 of detecting a surface providing a specular reflection. The method 1100 may be performed by a device such as device 120. The method 1100 may be performed at a mobile device, HMD, desktop, laptop, server device, or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory).

At block 1102, the method 1100 produces an identifier via a light source at a device. The identifier may be a unique number, symbol, or pattern specific to the device that is displayed on a display of the device. In another example, the identifier is a unique light pattern produced by a light at the device. In another example, the identifier is produced by emitting infrared light from an infrared light source. An identifier may be temporally encoded, e.g., as a temporal signature, in light emitted from a light source. The identifier may change over time, for example, based on a predetermined or automatic sequence generator. The identifier may, for example, be displayed continuously on a display and updated periodically, e.g., every 10 seconds.

In some implementations, the identifier is produced based on additional information. For example, the brightness of the physical environment may be determined via an ambient light sensor or otherwise and a brightness of the identifier may be selected accordingly, e.g., providing a brighter identifier in brighter environments to improve detection or a less bright identifier in less bright environment to conserve system resources.

In another example, the identifier is produced based on detecting a capability of the device (e.g., the device's imaging capabilities or processing capabilities that may affect its ability to detect a reflection of the display). The display parameter for displaying the identifier may be selected based on these capabilities. For example, if the display of the device can only be detected with low confidence, a display content may be enhanced or selected that is e.g. brighter, has a higher contrast, has stronger gradients, etc.

The identifier may be produced in synchronization with a camera that obtains the image. In some implementations, content or other emitted light is pulsed, strobed, or flickered in synchronization with the camera, such that the display is bright/on during the camera's integration period while it is dark/off while the camera's sensor does not integrate.

At block 1104, the method 1100 obtains an image of a physical environment, for example, using visible light and/or IR sensor.

At block 1106, the method 1100 determines that the image includes a specular reflection of the device based on detecting content corresponding to the identifier in the image and determining that the identifier uniquely corresponds to the device. For example, this may involve determining that the identifier provides a number, symbol, or light pattern that corresponds to the device rather than any other device in the physical environment. In some implementations, the method 1100 first detects a display reflection, e.g., image content that may correspond to a reflection of a display, and then identifies the identifier within display reflection in the image. The method 1100 may determine that the image includes the specular reflection of the device based on identifying a temporal signature in light emitted from a light source on the device.

Determining that the image includes the specular reflection may involve determining that a portion in the image does not correspond to a direct view or reflection of another device. This may involve determining that the content in the image has a position and orientation consistent with a reflected device, for example, by identifying a symmetry transform between a device's actual position and a corresponding position of a reflected device. If no such transform can be identified, the method 1100 may determine that a content of the image does not correspond to a reflection of the device.

At block 1108, the method 1100 determines a location of a surface in the physical environment that provided the specular reflection. The location is determined based on the specular reflection in the image. Determining the surface location may be based on the known/determined location and orientation of the device in the physical environment and the position or size of the specular reflection in the image.

The location of a surface in a physical environment that provides a specular reflection can be used for a variety of purposes. In one example, the location of the surface may be used to provide a notification to a user. For example, a notification may be provided based on the proximity of a user/user device to the surface to prevent the user from colliding with the surface. In another example, the location of the surface may be used in rendering a virtual reflection of a virtual object. In another example, the location of the surface is used to correct or adjust a 3D model of a physical environment.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context. As used herein, the term "or" refers to either or both of the two or more stated possibilities.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor:
   determining that a view of a computer-generated reality (CGR) environment includes a reflection from a surface of a user or an electronic device in contact with the user;
   identifying replacement content to replace at least a portion of the reflection of the user or the electronic device, the replacement content comprising data from a body facing sensor of the electronic device; and generating a modified view of the CGR environment based on the view of the CGR environment and the replacement content.

2. The method of claim 1, wherein the electronic device is a head-mounted device (HMD), the method further comprising:

using computer vision to recognize the reflection in an image, wherein reflection is a reflection of the HMD.

3. The method of claim 1, wherein the view of the CGR environment is determined to include a reflection based on a three-dimensional (3D) model of a physical environment, the method further comprising:

identifying a viewpoint in the 3D model based on an angle of the viewpoint relative to the surface.

4. The method of claim 1 further comprising:

identifying reflective properties, transparency properties, or roughness properties of the surface, wherein the modified view of the CGR environment is generated based on the reflective properties, transparency properties, or roughness properties of the surface.

5. The method of claim 1, wherein the electronic device is a head-mounted device (HMD) and identifying the replacement content includes identifying virtual representations of the user's cheeks, ears, hair, eyes, or eyebrows.

6. The method of claim 1, wherein identifying the replacement content includes identifying a virtual accessory for the electronic device.

7. The method of claim 1, wherein identifying the replacement content includes identifying a virtual device to replace the electronic device, wherein the virtual device and the electronic device are different versions of a same type of device.

8. The method of claim 1, wherein identifying the replacement content includes identifying virtual content to replace the electronic device, wherein the virtual content is moved in the CGR environment based on movement of the electronic device.

9. The method of claim 1 further comprising:

identifying an avatar, wherein identifying the replacement content includes matching a size or shape of the avatar with the user.

10. The method of claim 9, wherein identifying the avatar is based on stored data or an image collected by one or more cameras facing the user.

11. The method of claim 1 further comprising:

estimating a background of the user, wherein the replacement content includes the estimated background.

12. A system comprising:

a processor and a computer-readable storage medium comprising instructions that upon execution by the processor cause the system to perform operations, the operations comprising:

determining that a view of a computer-generated reality (CGR) environment includes a reflection from a surface of a user or an electronic device in contact with the user;

identifying replacement content to replace at least a portion of the reflection of the user or the electronic device, the replacement content comprising data from a body facing sensor of the electronic device; and generating a modified view of the CGR environment based on the view of the CGR environment and the replacement content.

13. The system of claim 12, wherein the electronic device is a head-mounted device (HMD), the operations further comprise:

using computer vision to recognize the reflection in an image, wherein reflection is a reflection of the HMD.

14. The system of claim 12, wherein the view of the CGR environment is determined to include a reflection based on a three-dimensional (3D) model of a physical environment, the operations further comprising:

identifying a viewpoint in the 3D model based on an angle of the viewpoint relative to the surface.

15. The system of claim 12, wherein the electronic device is a head-mounted device (HMD) and identifying the replacement content includes identifying virtual representations of the user's cheeks, ears, hair, eyes, or eyebrows.

16. The system of claim 12, wherein the operations further comprise:

identifying reflective properties, transparency properties, or roughness properties of the surface, wherein the modified view of the CGR environment is generated based on the reflective properties, transparency properties, or roughness properties of the surface.

17. The system of claim 12, wherein identifying the replacement content includes identifying a virtual device to replace the electronic device, wherein the virtual device and the electronic device are different versions of a same type of device.

18. The system of claim 12, wherein identifying the replacement content includes identifying virtual content to replace the electronic device, wherein the virtual content is moved in the CGR environment based on movement of the electronic device.

19. The system of claim 12, wherein the operations further comprise:

identifying an avatar, wherein identifying the replacement content includes matching an orientation or size of the avatar with the user.

20. A non-transitory computer-readable storage medium storing program instructions that are executable to perform operations comprising:

determining that a view of a computer-generated reality (CGR) environment includes a reflection from a surface of a user or an electronic device in contact with the user;

identifying replacement content to replace at least a portion of the reflection of the user or the electronic device, the replacement content comprising data from a body facing sensor of the electronic device; and generating a modified view of the CGR environment based on the view of the CGR environment and the replacement content.

* * * * *